May 1, 1962  D. M. PHILLIPS  3,032,606
AERIAL CABLE BRACKET
Filed Nov. 22, 1960

INVENTOR.
Davis M. Phillips
BY
James T. Ryan
Attorney

United States Patent Office 3,032,606
Patented May 1, 1962

3,032,606
AERIAL CABLE BRACKET
Davis M. Phillips, South Milwaukee, Wis., assignor to McGraw-Edison Company, Milwaukee, Wis., a corporation of Delaware
Filed Nov. 22, 1960, Ser. No. 71,089
4 Claims. (Cl. 174—148)

This invention relates to brackets for overhead electrical lines and, more particularly, to a corner bracket for use with spacer type aerial cable systems.

Spacer type aerial cable has in recent years been utilized for distribution systems in various parts of the country. The popularity of this system has largely been due to the fact that it is much less expensive than an underground system and superior to open wire systems in that appearance is improved and installation simplified without increasing the costs of the system.

The most commonly utilized aerial cable system involves three spaced apart conductors and a messenger wire spaced apart therefrom and situated thereabove. The conductors are generally situated in such a manner that they approximate either a V-shaped configuration or an inverted V-shaped configuration.

In systems of this type it is highly important that the distance between conductors be maintained to prevent flashover and short circuiting between conductors and also to avoid the institution of radio and telephone noise. Suspension type spacers of various kinds have been developed to maintain cable spacing between poles and some of these have been adapted for use with poles to maintain spacing.

However, the above devices have not been too successful at locations where cornering of the cable is desired. This has been largely due to the fact that torsional loadings and transverse loadings as well as high vertical loadings occur on these corners, which over-all exceed the strength of suspension type spacers. Tangent spacers have also been utilized in conjunction with the cornering of spaced cables but the transverse loadings to which they are subjected have been found to be too severe for these type spacers.

In general, prior art devices which have been utilized in conjunction with aerial cable systems on corners and angle runs in addition to being structurally inadequate are difficult to install in that they involve a plurality of component parts and affixing structures, are by and large not aesthetically pleasing, have no adaptability to different types of aerial cable distribution systems, and take up a good deal of space on the utility pole.

It is, therefore, an object of this invention to provide a new and improved aerial cable bracket which has increased strength and which may be attached to a pole with great facility.

Another object of this invention is to provide an aerial cable bracket which will maintain a predetermined cable spacing.

A further object of this invention is to provide an aerial cable bracket which is economical to produce and which involves a minimum of component parts.

A still further object of this invention is to provide a bracket for use with aerial cable which is aesthetically pleasing and which takes up a minimum amount of pole space.

A still further object of this invention is to provide an aerial cable bracket which is particularly useful on corners and angle runs and which may be adapted to existing aerial cable systems with a minimum of time, effort and difficulty.

Other objects and advantages of this invention will be apparent from the following description of the preferred embodiments of the invention taken in connection with the accompanying drawings in which.

Figure 1:
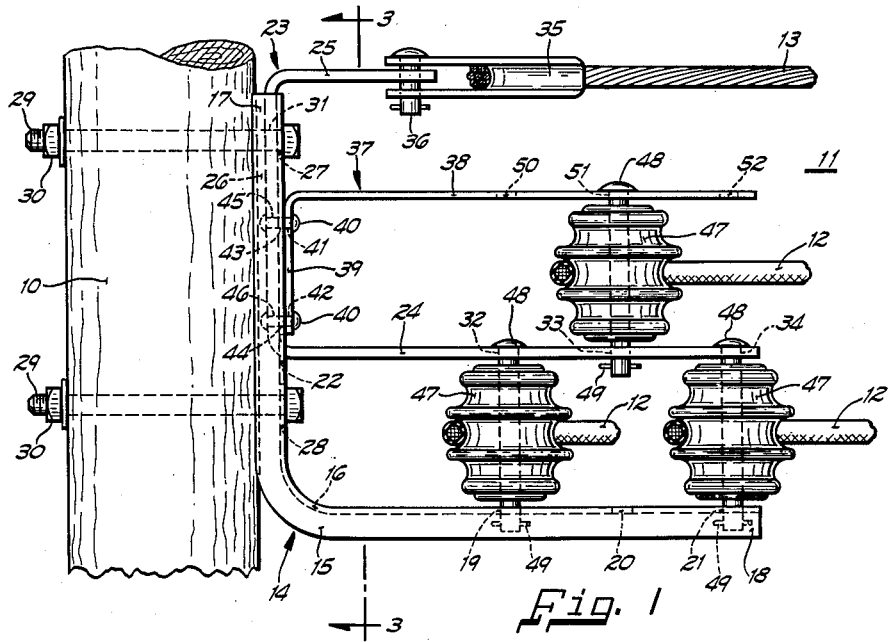
FIG. 1 is a view in side elevation of the invention in conjunction with one type of aerial cable system.

Referring now to FIG. 1, 10 indicates a utility pole or other vertical supporting structure to which the bracket 11 of the invention is attached to change the direction of a plurality of conductors 12 and a messenger cable 13. The bracket 11 comprises an L-shaped channel member 14 of U-shaped cross-section and which includes flange members 15 and a web 16. The channel member 14 includes a first leg 17 and a second somewhat longer leg 18. As can be seen the longer leg 18 has spaced apart apertures 19, 20 and 21 thru the web 16 thereof, the function of which will be explained subsequently.

The leg 17 has an aperture 22 in the web 16 thereof. A U-shaped member 23 having a long leg (side) 24, a shorter leg (side) 25 and a transverse portion 26 is associated with the member 14 in such a manner that leg 24 protrudes thru aperture 22 extending substantially parallel to the leg 18 of member 14 while transverse portion 26 lies along the web 16 between the flanges 15 of leg 17. The shorter leg 25 extends at approximately right angles from the upper portion of leg 17 in substantially parallel relation to leg 18 of member 14 and leg 24.

Apertures 27 and 28 are provided in the web of leg 17 and bolts 29 extend therethrough and thru the pole 10 being firmly affixed thereto by means of nuts 30. It is to be noted that the bolt 29 which extends thru aperture 27 also extends thru an aligned aperture 31 in the transverse portion 26 of the U-shaped member. In this manner, the U-shaped member and the member 14 are affixed to each other and to the pole.

The long leg 24 of the U-shaped member has apertures 32, 33 and 34 therein which are respectively immediately above the apertures 19, 20 and 21 in the leg 18. At the extremity of short leg 25 is a thimble clevis member 35 which is affixed thereto by holding means 36.

A support member 37 (L-shaped) having a first elongate portion (upright) 38 and a second basal portion 39 is affixed to leg 17 of member 14 and transverse portion 26 of member 23 by means 40 which extend thru apertures 41 and 42 in portion 39 and thru the aligned apertures 43, 45 and 44, 46 in the web 16 of leg 17 and in transverse portion 26.

Figures 2, 3:
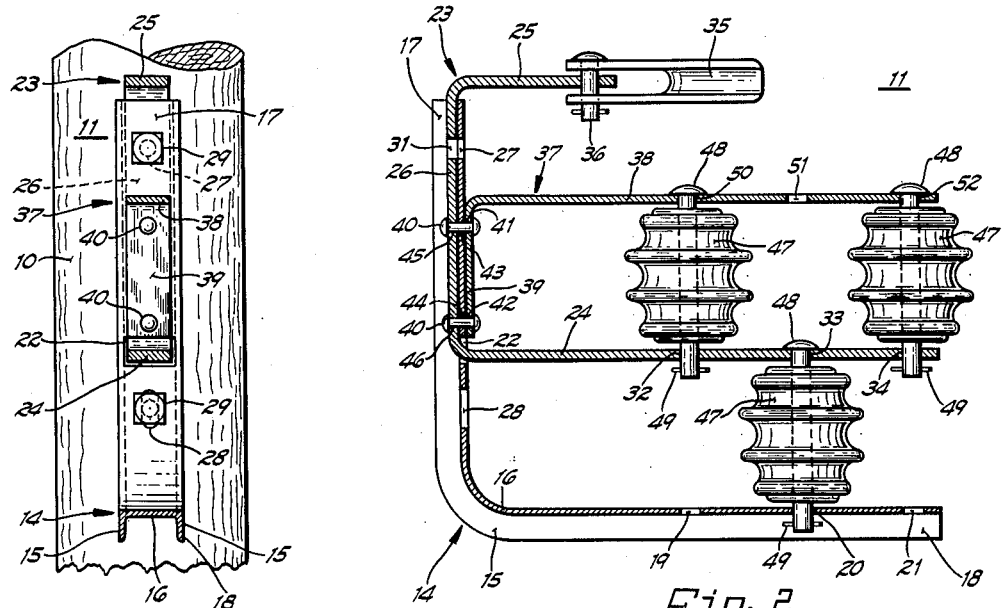
FIG. 2 is a partially cutaway view of the invention in side elevation in conjunction with another type of aerial cable system.
FIG. 3 is a view in frontal elevation of the invention taken along lines 3—3 of FIG. 1.

As is shown in FIG. 1, spool type insulators 47 may be mounted and affixed between parallel legs 24 and 18 and 24 and 38. More particularly, the insulators 47 are affixed as by means 48, 49 in apertures 32, 19 and 33, 51 and 34, 21. This particular configuration is especially adapted to an inverted V-shape conductor configuration. To accommodate a V-shape configuration of conductors the spool insulators would merely be rearranged (FIG. 2) so that insulators were positioned in apertures 32, 50 and 33, 20 and 34, 52.

The bracket shown and described has many structural advantages. The fact that the flanges 15 of leg 17 grip spaced apart portions of the periphery of the pole member imparts lateral strength to the bracket. This is particularly significant in resisting wind loadings and in resisting the frictional forces developed between insulators and conductors. The fact that the lowermost support member is of channel shape imparts over-all strength to the structure since it serves as a substantially immobile basal supporting structure.

In addition to the inherent structural strength of the bracket, it has the insulator transposition feature (accommodates different conductor congurations) which makes it truly a universal bracket. Secondly, since the structure is in one piece (i.e., means 40 are affixed to legs 39, 17 and transverse portion 26) prior to fastening to the pole, such fastening is capable of being easily accomplished. In particular, the bolts 29 are inserted in the correct apertures in leg 17 thence thru pre-drilled holes in the pole member, and the nuts are positioned on the bolts to firmly affix the structure to the pole.

While one basic embodiment of the invention has been shown and described, it will be obvious to those skilled in the art that various changes and modifications may be made therefrom without departing from the invention and, therefore, it is intended for the appended claims to cover all such changes and modifications as fall within the true spirit and scope of the invention.

I claim:

1. A corner bracket for use with spacer type aerial cable comprising; a channel member having a pair of substantially perpendicular legs, one of said legs having an aperture therein and being affixed to a vertical structure along the major axis thereof, a substantially U-shaped member having parallel leg portions and a transverse portion, said transverse portion being affixed to said one perpendicular leg between the flanges thereof, one of said parallel leg portions extending thru said aperture in said one perpendicular leg and the other of said parallel leg portions emerging from the extremity of said one leg and extending in a direction substantially parallel to the other of said perpendicular legs, an L-shaped member having a first portion extending between said parallel leg portions and substantially in parallel relation thereto and a second portion secured to said one perpendicular leg, clevis means mounted at the extremity of one of said parallel leg portions, and insulating means mounted between the other of said perpendicular leg portions and between said other of said parallel leg portions and said first portion of said L-shaped member.

2. A pole mounted corner bracket for use with spacer type aerial cable comprising, a first member having substantially perpendicular leg portions, one of said perpendicular leg portions being affixed to said pole along the major axis thereof, a substantially U-shaped member having the transverse portion thereof affixed to said one perpendicular leg portion, an L-shaped member having the base thereof affixed to said one perpendicular leg portion and having the upright portion thereof extending between the sides of said U-shaped member in substantially parallel relation thereto, clevis means affixed to one of the sides of said U-shaped member, and insulating means mounted between the other of said perpendicular leg portions and the other of said sides of said U-shaped member and between said other of said sides of said U-shaped member and said upright portion of said L-shaped member.

3. An aerial cable corner bracket comprising a channel member having a first portion constructed and arranged to grip spaced apart portions of the periphery of a pole member and a second portion extending substantially in a normal direction from said first portion, a unitary U-shaped member having the transverse portion thereof affixed to said first portion of said channel member and having the side portions thereof vertically spaced above said second portion of said channel member, a member affixed to said first portion of said channel member and to said transverse portion of U-shape member and having a portion thereof extending between the side portions of said U-shape member in a direction substantially parallel with respect thereto, clevis means affixed to the extremity of one of the side portions of said U-shape member, and conductor engaging means mounted between said second portion of said channel member and the other side portion of said U-shape member and between said other side portion of said U-shape member and said parallel portion of said member affixed to said first portion of said channel member.

4. An aerial cable corner bracket comprising; a substantially L-shaped channel member, a substantially U-shaped member having the transverse portion thereof affixed to one of the legs of said L-shaped channel member, a substantially L-shaped member having one of the legs thereof affixed to said one leg of said L-shaped channel member, cable engaging means affixed to one leg of said U-shaped member, and insulating means mounted between the other leg of said L-shaped channel member and the other leg of said U-shaped member and between said other leg of said U-shaped member and the other leg of said L-shaped member.

References Cited in the file of this patent
UNITED STATES PATENTS

| | | |
|---|---|---|
| 1,871,519 | Hawley | Aug. 16, 1932 |
| 2,657,889 | Smalley | Nov. 3, 1953 |